United States Patent [19]

Brüssel

[11] Patent Number: 4,954,067
[45] Date of Patent: Sep. 4, 1990

[54] HYDRAULIC PRESS

[75] Inventor: Richard Brüssel, Sulzfeld, Fed. Rep. of Germany

[73] Assignee: Fried. Krupp Gesellschaft mit beschränkter Haftung, Essen, Japan

[21] Appl. No.: 303,348

[22] Filed: Jan. 30, 1989

[30] Foreign Application Priority Data

Jan. 30, 1988 [DE] Fed. Rep. of Germany ....... 3802761

[51] Int. Cl.⁵ .................... B29C 43/32; B30B 15/24
[52] U.S. Cl. ................. 425/406; 100/258 A;
100/269 R; 425/451; 425/DIG. 47
[58] Field of Search ............... 100/258 A, 259, 260,
100/269 R; 264/40.5, 40.7; 425/107, 406, 408,
450.1, 451, 451.2, 589, 590, DIG. 47

[56] References Cited

U.S. PATENT DOCUMENTS

| | | | |
|---|---|---|---|
| 2,809,543 | 10/1957 | Zeitlin | 100/258 A |
| 3,208,373 | 9/1965 | Bachelier | 425/408 |
| 3,587,138 | 6/1971 | Bammert | 425/589 |
| 3,716,323 | 2/1973 | Classen | 425/451.2 |
| 3,825,386 | 7/1974 | Bello et al. | 425/150 |
| 3,921,286 | 11/1975 | Petersen | 384/12 |
| 3,994,540 | 11/1976 | Petersen | 384/12 |
| 4,076,780 | 2/1978 | Ditto | 264/40.5 |
| 4,341,105 | 7/1982 | Gerrick, Jr. | 100/269 R |
| 4,445,840 | 5/1984 | Kenmochi | 425/450.1 |
| 4,457,684 | 7/1984 | Gram | 425/451.9 |
| 4,759,280 | 7/1988 | Malashenko | 425/451.2 |

FOREIGN PATENT DOCUMENTS

| | | |
|---|---|---|
| 554810 | 7/1932 | Fed. Rep. of Germany . |
| 1136574 | 9/1962 | Fed. Rep. of Germany . |
| 2240674 | 3/1973 | Fed. Rep. of Germany ...... 425/406 |
| 3207242 | 9/1982 | Fed. Rep. of Germany . |
| 2128541 | 5/1984 | United Kingdom ............. 425/451.2 |

*Primary Examiner*—Jay H. Woo
*Assistant Examiner*—C. Scott Bushey
*Attorney, Agent, or Firm*—Spencer & Frank

[57] ABSTRACT

A hydraulic press has a press stand; a generally horizontal press plate vertically movably supported in the press stand and arranged for executing forward and return strokes; and a plurality of hydraulic press cylinder units mounted in the press stand above the press plate. Each press cylinder unit has a power cylinder and a plunger slidably received in the power cylinder and extending from the power cylinder to the press plate. There are further provided a plurality of hydrostatic bearings mounted on the press plate; and a chamber defined with each hydrostatic bearing and containing hydraulic fluid. The lower terminus of the plunger projects into the chamber. The hydrostatic bearings constitute a force-transmitting arrangement between the plungers and the press plate and permit a tilting motion of the plungers relative to the press plate. Guide assemblies are mounted at the end of each power cylinder for sealingly and tiltably guiding the plunger.

14 Claims, 2 Drawing Sheets

HYDRAULIC PRESS

BACKGROUND OF THE INVENTION

This invention relates to a hydraulic press particularly for the mold-pressing of fiber-reinforced synthetic materials. The hydraulic press is of the type in which the pressing force is applied to a press plate by at least one hydraulic press cylinder unit at a location where the cylinder unit is connected to the press plate. The press plate is guided laterally and may be braked by countersupport devices. The connection between the hydraulic press cylinder unit and the press plate is formed by a hydrostatic bearing element including an annular body which is partially filled with hydraulic fluid and which is provided with at least one inner annular sealing element. The plunger-like piston rod of the press cylinder unit extends into the annular body such that a relative angular motion between the press plate and the plunger is ensured.

A hydraulic press of the above-outlined type is disclosed, for example, in U.S. Pat. No. 4,076,780. In such plastic molding presses the parallel run of the press plate is ensured by countersupport devices in the zone in which the pressing force becomes effective. The guidance of the press plate during the rapid-motion closing phase must center the press plate only to such an extent that a shock-free immersion of the tool guides into the countersupport devices is ensured. By virtue of the fact that the press plate, after contacting the countersupport devices, is normally engaged under conditions of static redundancy, ways have been sought to avoid such an occurrence. Thus, it is known to guide the press plate during the rapid closing with hydraulically positioned runner rollers on circular columns arranged on either side of the press plate and, after the penetration of the tool guides into the countersupport devices, to remove the forces applied to the runner rollers, that is, to render such a press plate guide ineffective. It is further known to couple the press cylinder unit with the press plate by spherical joints.

The known constructions, however, cannot provide for a desired free self-orientation (self-setting) of the press plate. Even a known spherical joint connection is to be regarded as a rigid coupling during the prevailing surface pressures.

In another known hydraulic press, disclosed in German patent document No. 3,207,242, which is a counterpart of U.S. Pat. No. 4,457,684, a hydrostatic bearing is utilized for applying the press forces from below to a vertically movable press table. The hydrostatic bearing is formed on the top of the piston of the press cylinder unit and thus has no element into which a component of the press cylinder could penetrate. In this arrangement the sealing problems encountered at the parts which transmit pressing forces are very difficult to overcome, if at all possible.

Further, German patent document No. 1,136,574 discloses a device for transferring pressing forces in hydraulic presses into the movable transverse press head. In the center of the hydrostatic bearing, however, an additional bearing formed as a spherical shell is provided which locally delimits the hydrostatic bearing. Since the hydraulic fluid is admitted to the hydrostatic bearing from the hydraulic cylinder through an axially parallel bore provided in the piston, the piston has to be specifically prevented from being pushed out of the bowl-shaped bearing member. For this purpose a tension anchor is secured centrally to the terminus of the piston and the bearing body. It is a significant disadvantage of this arrangement that it is adapted only for a hydraulic press which is provided with a sole location where pressing forces are transferred from the force-generating unit. This is so because, in case of a simultaneous use of several such arrangements which exert a force parallel to the movable transverse head of the press, stresses are generated in case of oblique orientations of the transverse head as a result of distance variations of the axes of the associated components which in the normal state are aligned with one another.

SUMMARY OF THE INVENTION

It is an object of the invention to provide an improved hydraulic press of the above-outlined type in which the connection between the press cylinder unit and the press plate permits a relative motion which does not involve appreciable transverse or torque forces.

This object and others to become apparent as the specification progresses, are accomplished by the invention, according to which, briefly stated, at least two press cylinder units exert forces symmetrically from above on the press plate, and the plunger of each press cylinder unit is, in the end zone of the cylinder part, guided in a sealed and angularly displaceable (tiltable) manner.

The advantages achieved by the invention reside particularly in that despite the connection which is provided between the press cylinder unit and the press plate and which is practically free from transverse and torque forces, the required application of large normal forces to the press plate is not adversely affected.

The invention is particularly adapted for use in presses in which the press cylinder units are arranged above the press plate and project into upwardly open apertures of the press plate. The invention, however, may be advantageously utilized in other press force transmission systems without difficulty by means of appropriate force-transmitting constructions.

DESCRIPTION OF THE PREFERRED EMBODIMENT

Figure 1:
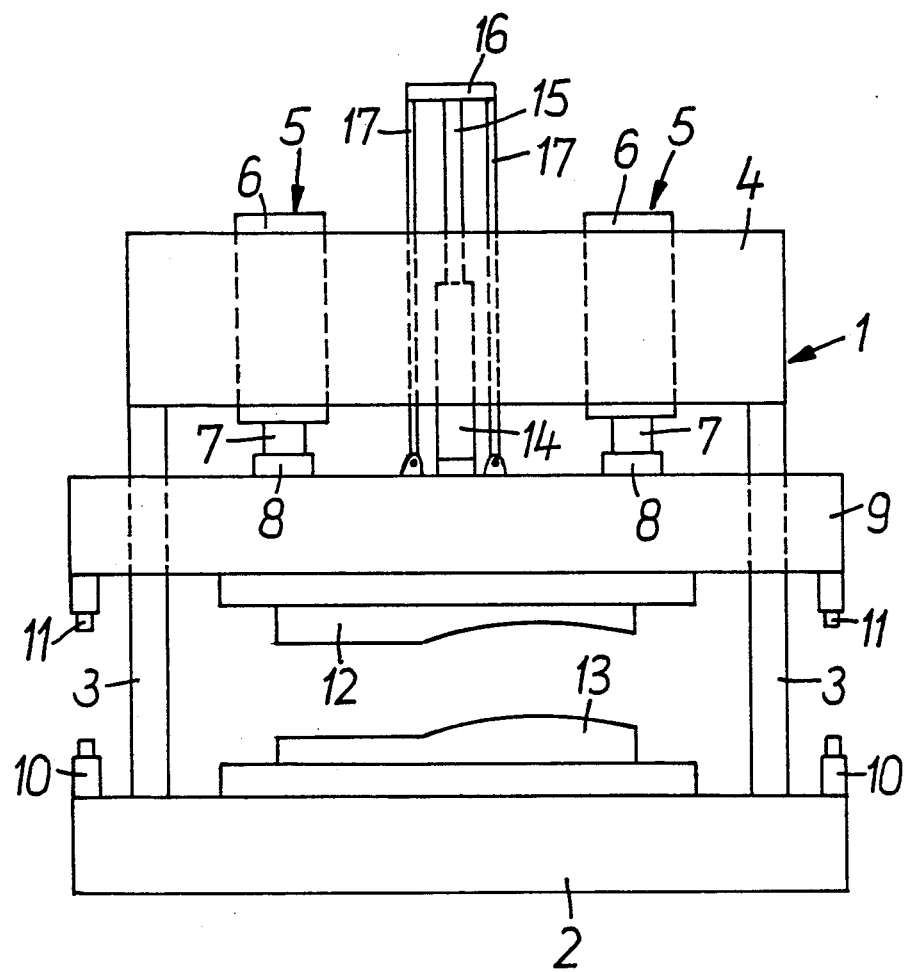
FIG. 1 is a schematic side elevational view of a hydraulic press incorporating the invention.

Turning to FIG. 1, there is illustrated therein a hydraulic press which comprises a frame-like stand 1 formed of a press table 2, two laterally arranged columns 3 situated adjacent the lateral edges of the press table 2 and a transverse head 4 connecting the two columns 3 with one another at the top.

In the transverse head 4 there are arranged two press cylinder units 5 each having a hydraulic power cylinder 6 arranged symmetrically relative to the two vertical central planes of the press. Each cylinder unit 5 has a plunger 7 which constitutes the piston and the piston rod and which projects into a respective hydrostatic bearing element 8 mounted on the top of a press plate 9 guided at opposite lateral ends by the two columns 3. The guidance of the press plate 9 on the columns 3 is effected by non-illustrated, hydraulically pressable runner rollers of conventional construction. At opposite lateral ends of the press table 2 there are arranged pairs of hydraulic cylinders 10 which serve as countersupport devices, each cooperating with a respective, height-adjustable threaded spindle 11 mounted on the press plate 9. The press plate 9 and the press table 2 carry the upper and lower part 12 and 13, respectively, of the pressing tool (mold). Since the press cylinder units 5 transfer only pressure forces to the press plate 9, a return cylinder 14 centrally arranged with respect to the press and mounted on the transverse head 4 serves to perform a lifting stroke to raise the press plate 9 into its starting position. For this purpose, the upwardly retractable piston rod 15 of the return cylinder 14 engages via a transverse beam 16 two pull rods 17 which are anchored on the top face of the press plate 9.

Figure 2:
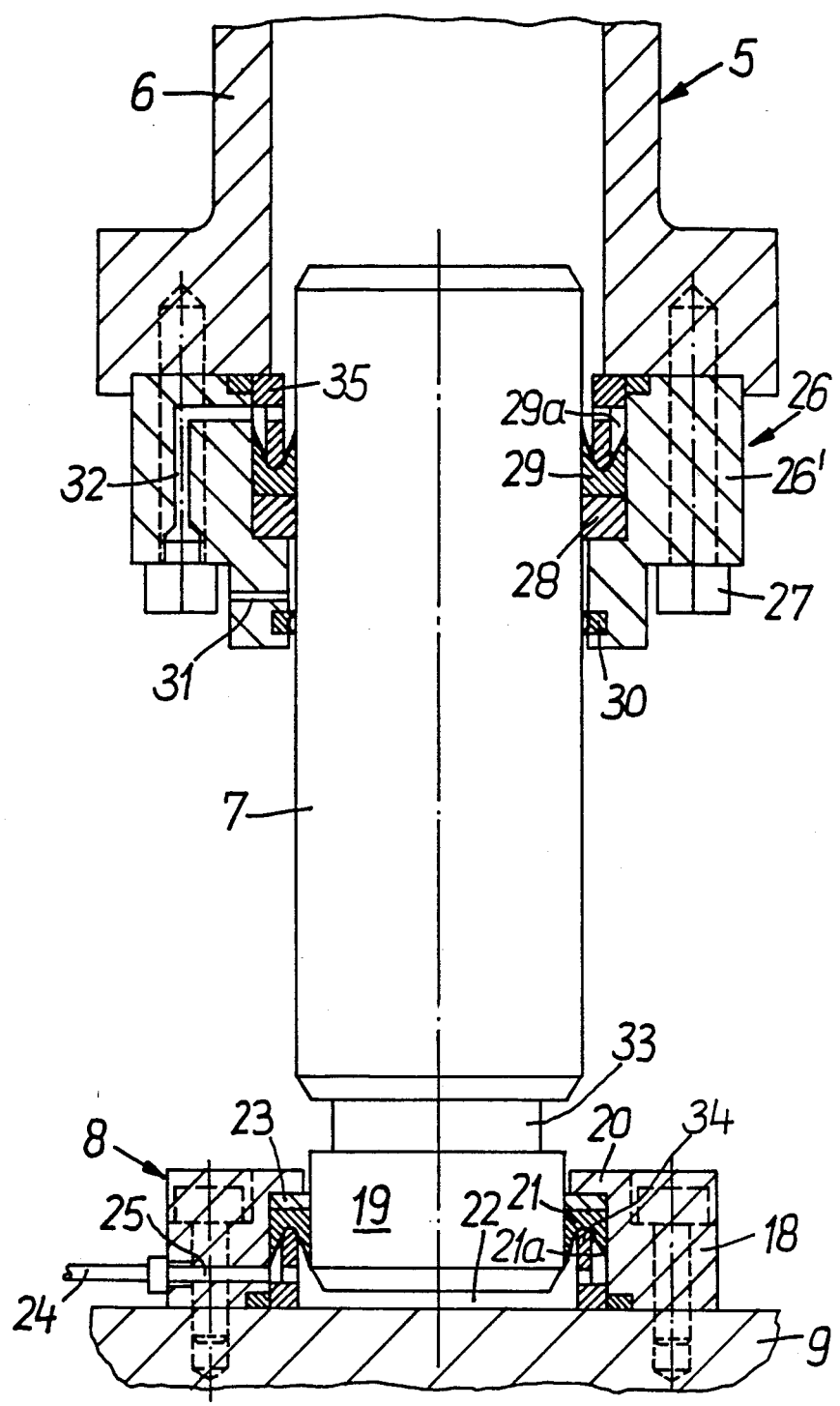
FIG. 2 is an enlarged sectional elevational detail of the structure shown in FIG. 1, illustrating a preferred embodiment of the invention.

FIG. 2 illustrates one of the plungers 7 and the associated sealing and supporting mechanism to be now described in greater detail.

The hydrostatic bearing element 8 has an annular body 18 mounted by screws on the upper face of the press plate 9. The plunger 7 which constitutes the piston and the piston rod of the press cylinder unit 5 has a terminal head 19 which extends into the annular body 18 and which is removably secured to the plunger 7. At the upper face of the ring body 18 oriented away from the press plate 9 a radially inwardly extending flange 20 is provided which serves for supporting an annular sealing element 21. Between the head 19 and the upper face of the press plate 9 thus a closed chamber 22 is formed which is filled with hydraulic fluid and by means of which a hydrostatic force transmission from the press cylinder unit 5 to the press plate 9 is effected. Between the sealing element 21 and the flange 20 there is arranged an annular guide element 23 which constitutes the sole guide between the head 19 and the ring body 18. By virtue of this arrangement advantageously a very short engagement length is obtained which permits relative tilting displacements between the head 19 and the guide element 23. The sealing element 21 has a downwardly oriented annular groove 21a, whose bottom is engaged by the upper circular edge of a support sleeve 34, supported, in turn, on the top face of the press plate 9. A radial port 25 and associated nipple 24 are provided in the annular body 18 for replenishing the hydraulic fluid.

At the end of the cylinder 6 of the press cylinder unit 5 the plunger 7 is held in a guide assembly 26 whose annular body 26' is secured by screws 27 to the radial end of the cylinder 6. The guide assembly 26 comprises a guide element proper which is formed of an elastic (for example, plastic) guide ring 28 of short axial length. The guide ring 28 is axially adjoined on the side of the cylinder 6 by a sealing ring 29 which is provided with a circumferential groove 29a in its radial face oriented towards the cylinder unit 5. The bottom of the groove 29a is engaged by the lower circular edge of a support sleeve 35, supported, in turn, on the outer radial edge face of the cylinder 6. At the outer end of the annular guide body 26' there is provided a sealing ring 30 serving as an oil stripper, and between the sealing ring 30 and the guide ring 28 a leakage port 31 is provided in the guide body 26' for the hydraulic fluid that has passed through the seals 28 and 29 from the press cylinder unit 5.

The guide ring 28 ensures a short axial engagement with the plunger 7 so that in cooperation with the guide element 23 an occasionally unavoidable "oblique positioning" of the plunger 7 under elimination of stresses is ensured.

The described embodiment has further the advantage that in the cylinder 6 of the press cylinder unit 5 no additional components exposed to wear are present which otherwise are required for the piston of a hydraulic cylinder unit. Combining the sealing components in the guide assembly 26 ensures an economic manufacture of the cylinder part 6.

The terminal head 19 is axially adjoined by a circumferential groove 33 which cooperates with holding elements for supporting the plunger 7 during replacement of the sealing element 21 and the guide element 23 and also serves for actuating a positional sensor.

It will be understood that the above description of the present invention is susceptible to various modifications, changes and adaptations, and the same are intended to be comprehended within the meaning and range of equivalents of the appended claims.

What is claimed is:

1. A hydraulic press comprising
   (a) a press stand;
   (b) a generally horizontal press plate vertically movably supported in the press stand and arranged for executing forward and return strokes;
   (c) a plurality of hydraulic press cylinder units mounted in said press stand above the press plate; each press cylinder unit having
       (1) a power cylinder having an end oriented towards said press plate; and
       (2) a plunger slidably received in the power cylinder and extending from the power cylinder to said press plate; said plunger having a lower terminus;
   (d) a plurality of hydrostatic bearings mounted on said press plate; a separate one of said hydrostatic bearings being associated with each plunger; each said hydrostatic bearing defining a chamber containing hydraulic fluid; said lower terminus of said plunger projecting into said chamber; the hydrostatic bearings constituting a force-transmitting arrangement between the plungers and said press plate and having means for permitting a tilting motion of the plungers relative to the press plate; and
   (e) means mounted at said end of each said power cylinder for sealingly and tiltably guiding the plunger at said end of each said power cylinder, said tilting and guiding means including a guide ring surrounding said plunger, and said guide ring having a sufficiently short axial length for permitting the tilting of the plunger at said end of said power cylinder.

2. A hydraulic press as defined in claim 1, further comprising countersupport means for braking said press plate during a terminal phase of said forward strokes.

3. A hydraulic press as defined in claim 1, further comprising means for laterally guiding said press plate during said forward and return strokes thereof.

4. A hydraulic press as defined in claim 1, wherein said hydraulic press cylinder units are arranged symmetrically relative to central vertical planes of the press.

5. A hydraulic press as defined in claim 1, further comprising an annular circumferential groove in said plunger adjacent said lower terminus; said annular circumferential groove being situated externally of the hydrostatic bearing.

6. A hydraulic press as defined in claim 1, wherein said lower terminus of each plunger includes a terminal head separably secured to the plunger.

7. A hydraulic press as defined in claim 1, wherein each means mounted at said end of each said power cylinder further comprises
(a) an annular body secured to said end of the power cylinder and supporting said guide ring; and
(b) sealing rings held in said annular body at opposite sides of said guide ring and surrounding said plunger.

8. A hydraulic press as defined in claim 1, each hydrostatic bearing comprising
(a) an annular body;
(b) an annular sealing element supported in said annular body; said annular sealing element bounding said chamber and circumferentially surrounding said plunger; and
(c) said means for permitting the tilting motion of the plungers relative to said press plate including an annular guide element supported in said annular body; said annular guide element circumferentially surrounding said plunger and having a sufficiently short axial length for permitting the tilting motion of the plungers relative to said press plate.

9. A hydraulic press as defined in claim 8, wherein said hydrostatic bearings are sealingly mounted on an upper surface of said press plate.

10. A hydraulic press as defined in claim 9, further comprising screws securing said annular body to said surface of said press plate.

11. A hydraulic press as defined in claim 10, further comprising a radial port in said annular body for charging said chamber with hydraulic fluid.

12. A hydraulic press as defined in claim 10, wherein said annular body has a top portion; further comprising a radially inwardly extending annular flange formed on said top portion and surrounding said lower terminus of the plunger; said annular flange retaining said annular sealing element.

13. A hydraulic press as defined in claim 10, wherein said hydrostatic bearings are sealingly mounted on an upper surface of said press plate.

14. A hydraulic press as defined in claim 13, further comprising screws securing said annular body to said surface of said press plate.

* * * * *